H. S. PUTNAM.
LOADING AND UNLOADING MECHANISM FOR TRANSPORTATION APPARATUS.
APPLICATION FILED MAY 23, 1922.
1,437,550.
Patented Dec. 5, 1922.
3 SHEETS—SHEET 1.
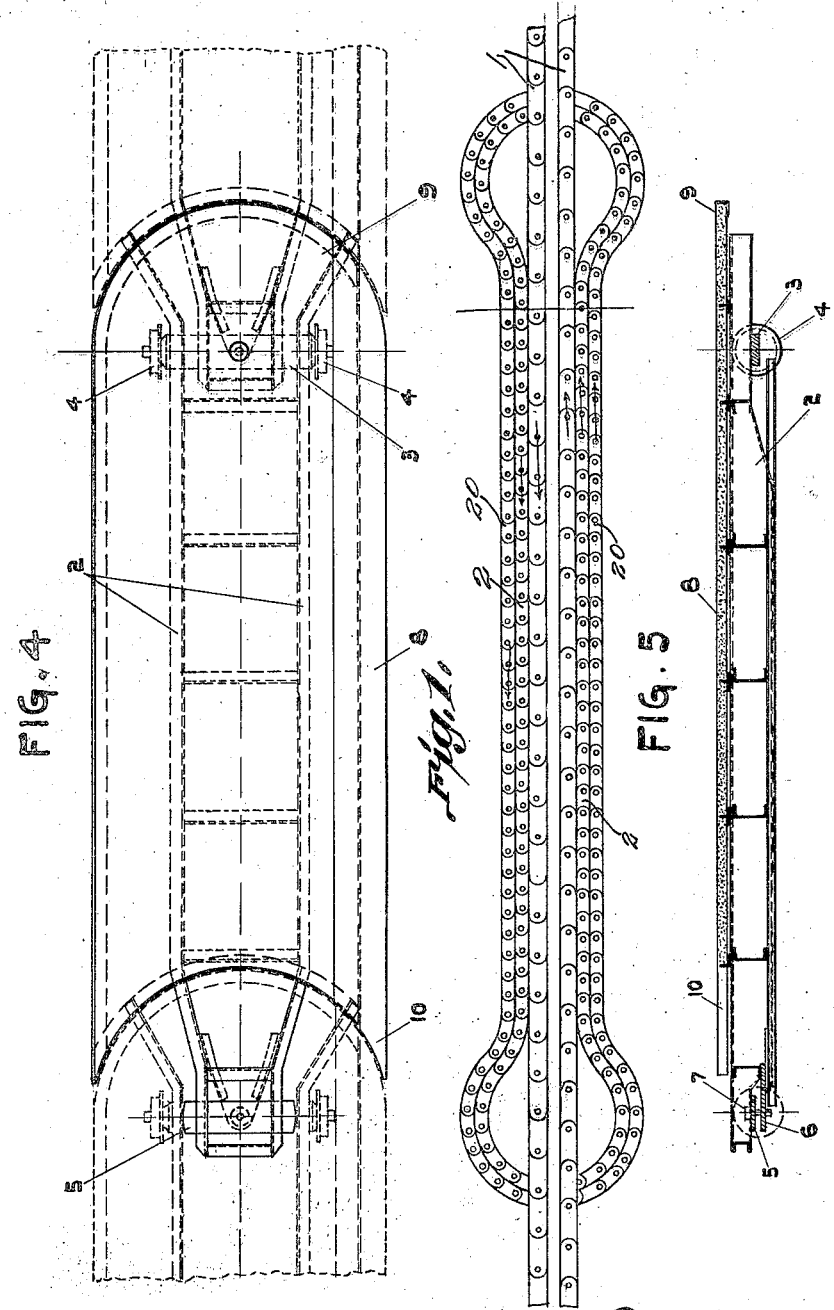
Henry S. Putnam INVENTOR
BY
Prindle Wright & Small ATTORNEYS

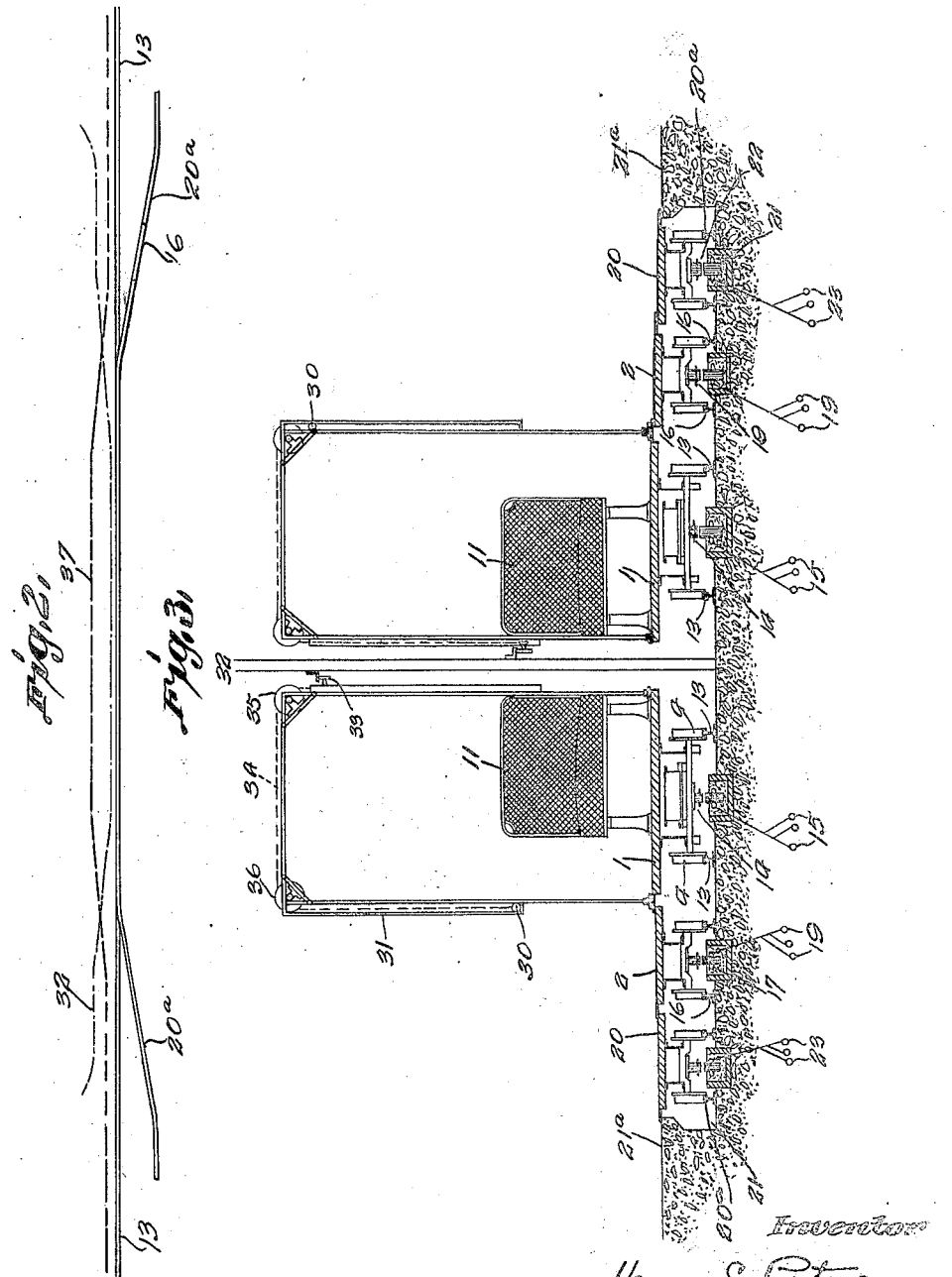

H. S. PUTNAM.
LOADING AND UNLOADING MECHANISM FOR TRANSPORTATION APPARATUS.
APPLICATION FILED MAY 23, 1922.

1,437,550.

Patented Dec. 5, 1922.
3 SHEETS—SHEET 3.

*Henry S. Putnam* INVENTOR

BY

*Prindle, Wright & Small* ATTORNEYS

Patented Dec. 5, 1922.

1,437,550

UNITED STATES PATENT OFFICE.

HENRY S. PUTNAM, OF NEW YORK, N. Y.

LOADING AND UNLOADING MECHANISM FOR TRANSPORTATION APPARATUS.

Application filed May 23, 1922. Serial No. 563,016.

*To all whom it may concern:*

Be it known that I, HENRY S. PUTNAM, a citizen of the United States, a resident of New York, in the county of New York and State of New York, have invented a certain new and useful Loading and Unloading Mechanism for Transportation Apparatus, of which the following is a specification.

The invention has for an object to provide in conjunction with a transportation apparatus adapted to operate continuously at a relatively high speed, a loading and unloading mechanism which will permit passengers or goods to be moved onto or off of the transportation apparatus without too great or sudden changes in velocity.

Another object of the invention is to provide such a loading and unloading mechanism which will be economical from the stand-points of cost of construction and amount of space required, to make it practical to install local landing and loading stations at the desired points along the transportation apparatus. In a preferred form of the invention the same loading and unloading mechanism is arranged to serve for passengers or goods desired to be carried in different directions.

The invention also aims to construct the transportation apparatus and its loading mechanism in such manner as to prevent the movement of passengers or goods onto or off the apparatus at improper points along the same.

Further objects and advantages of the invention will be in part obvious and in part specifically pointed out in the description hereinafter contained which, taken in connection with the accompanying drawings, discloses certain preferred embodiments thereof. Such embodiments, however, are to be considered merely as illustrative of its principle. In the drawings, Figure 1 is a diagrammatic plan view illustrating a loading and unloading mechanism constructed in accordance with the invention in operative relation to a transportation apparatus.

Figure 2 is a diagrammatic side elevation of the structure shown in Figure 1.

Figure 3 is a cross sectional view taken on the line 3—3 of Figure 1 but showing more in detail the elements of the loading mechanism and transportation apparatus.

Figures 4 and 5 are respectively a plan view and side elevation of a type of car or truck adapted to be used to make up the load carrying elements indicated diagrammatically in Figure 1.

Figure 6:
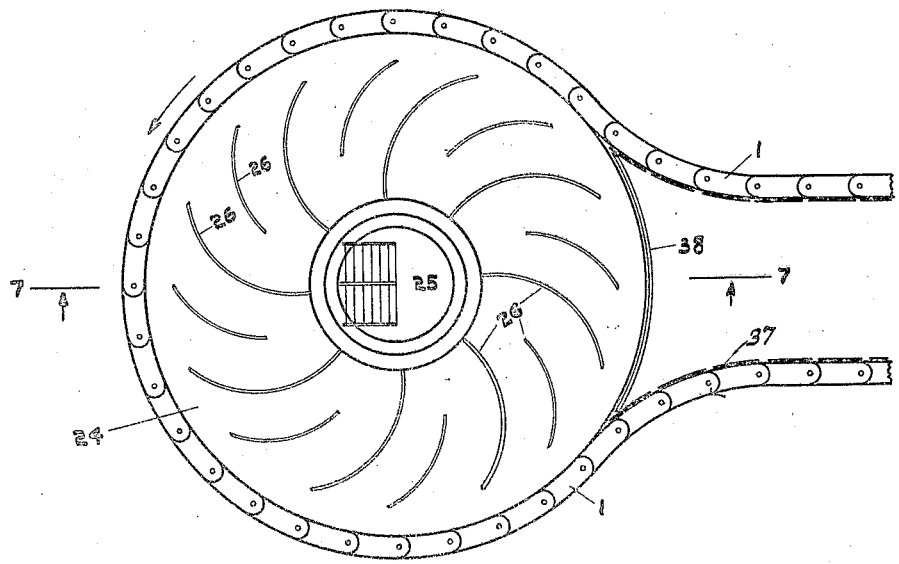
Figure 6 is a view similar to Figure 1 but illustrating a modified form of the invention.

The illustrated embodiments of the invention are particularly designed to be applied to the transportation of passengers or freight by means of a load carrying element 1 in the form of a series of cars constituting a belt-like platform which moves continuously along an endless path. The intermediate portions of the load carrying element preferably run fairly close to each other in order to provide transportation in opposite directions from points along the apparatus. Figure 1 shows merely the intermediate portion of such load carrying element, but loops (not illustrated) at the ends of the structure shown in the figure will be understood as necessary to a complete installation.

In the illustrated embodiment of the invention the load carrying element 1 is comprised of the series of cars shown more in detail in Figures 4 and 5. Referring particularly to said figures, the cars or trucks making up the load carrying element may be provided with a longitudinal supporting member 2 carrying at one end an axle 3 which supports wheels 4, and at its other end a coupling adapted to be connected to the axle 3 of an adjacent car; in the present instance this coupling takes the form of plates 5 and 6 adapted to be positioned respectively above and below the axle 3 of an adjacent car at its central point, and a pin 7 extending through the members 3, 6, and 7 to form a pivot between adjacent cars. The floors 8 of the cars are provided with circularly curved projecting portions 9 at one end of the car and similarly recessed portions 10 at the other end whereby when the cars are connected together to form a complete belt, they may move angularly relative to each other and nevertheless maintain a continuous platform in all necessary angular positions. Where the platform is to be used for the transportation of passengers, seats 11 (Figure 3) may be provided if desired.

In the present instance the load carrying element 1 is driven on the induction motor principle, by means of primary windings 12 located along the rails 13 which guide the cars, and short-circuited secondaries 14 of induction motor type suitably mounted underneath the cars in inductive relation to their primary windings. The conductors 15 (Figure 3) of a polyphase power system are connected to the primary windings 14 to create therein fields which move at the velocity which it is desired to obtain for the load carrying element 1. As the details of the electrical equipment employed to drive the load carrying element are not essential to the present invention, the same will not be described at greater length. Such equipment, however, is further described in my copending application Serial Number 561,184, filed May 15th, 1922, entitled Electrically operated transportation apparatus.

In order to permit the load carrying element 1 to move continuously at a relatively high rate of speed, and yet enable passengers or goods to pass to and from the platform at the desired points, I employ in connection with the load carrying element 1 any desired number of auxiliary load carrying elements 2 which travel along local endless paths disposed at points along the apparatus which are to be employed as stations. As shown in Figure 1, the auxiliary load carrying element 2 is made up of cars of the type previously described which constitute an endless belt running on rails 16 having their intermediate portions contiguous to the opposite sides of the load carrying element 1 and their end portions looped around to cross over or under the load carrying element 1, and thus where the opposite sides of the load carrying element 1 are not too widely spaced, the same auxiliary load carrying element 2 readily may be constructed to assist in loading or unloading passengers or goods coming from or desired to be moved in opposite directions.

The cars making up the auxiliary load carrying element 2 are driven at a speed so graduated with respect to the speed of load carrying element 1 as to enable passengers or goods to be safely moved onto the auxiliary load carrying element and from thence to the primary load carrying element without too sudden changes in velocity. For example, the auxiliary load carrying element 2 may be driven by primary windings 17 of the induction motor type and cooperating short-circuited secondary windings 18 similar to members 12 and 14 previously described, but energized through polyphase conductors 19 supplying current at a lower frequency, whereby the field created by primary windings 17 will travel at a velocity lower than that created by primary windings 12. If the speed of load carrying element 1 is fairly high it may be desirable to interpose a further auxiliary load carrying element 20 between the element 2 and the fixed station platform 21ª (Figure 3), the load carrying element 20 being also driven by primary windings 20ª and short-circuited secondaries 22 of the type previously described, the primary windings 21, however, being energized by means of conductors 23 which supply current at a still lower frequency whereby load carrying element 20 will move at a relatively low rate of speed. For example, if the load carrying element 1 moves at nine miles an hour, the auxiliary elements 2 and 20 may be operated at speeds respectively of six and three miles an hour, with the result that goods or passengers will be subjected to a change in velocity of only three miles per hour in passing to and from the load carrying element 1.

Figure 7:
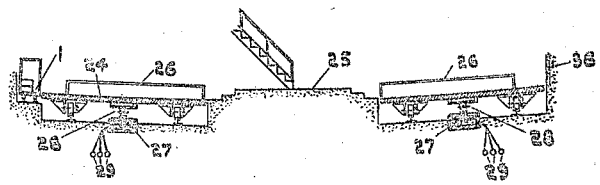
Figure 7 is a sectional view taken on the line 7—7 of Figure 6.

In Figures 6 and 7 I have illustrated a modified form of auxiliary load element 24 which is located concentric with a curved portion of the platform 1 and so related to a station platform 25 that the velocity of passengers or goods entering onto the element 24 from the platform will be relatively small in the first instance, since the portion of the element 24 upon which a first will enter, will be relatively close to the center of rotation of the element; but as the passengers pass toward the periphery of the element 24 their velocity will progressively increase and thus the speed of rotation of the element 24 may be adjusted to enable passengers or goods to pass onto load carrying element 1 without any appreciable change in velocity even though the load carrying element 1 be moving at a relatively high speed. If desired, guard rails 26, radiating from the center of the auxiliary load carrying element 24, may be employed to assist passengers in moving across the same, and it is also preferred to construct this auxiliary element in dished or concave form as illustrated in Figure 7 in order to counteract the tendency of centrifugal force to throw off balance, passengers or goods carried by such auxiliary element.

The auxiliary element 24 may be rotated in any suitable manner, for example, by primary windings 27, short-circuited secondaries 28, and polyphase conductors 29, similar to members 12, 14, and 15 previously described, the windings 27 creating a field moving at the speed necessary to rotate the element 24 as aforesaid.

The above embodiment of the invention produces in effect, an infinite number of auxiliary platforms graduated in speed, but without the necessity of driving them individually.

Particularly where a transportation apparatus of the above character is employed for passenger transportation it is preferred to arrange the apparatus in such a way as to prevent passengers from entering upon or alighting from the load carrying element 1 at improper times. As is illustrated in Figure 3, a guard member 30 may be employed running along the side of the load carrying element 1 and normally obstructing passage from such load carrying element, means being provided to move the guard member to inoperative position at points along the load carrying element which are opposite the auxiliary element 2 or 24 as the case may be. In the embodiment illustrated in Figure 3 the guard member 30 is in the form of a horizontal rail slidable up and down in brackets 31 carried by the element 1, the guard member normally resting by gravity in its lower operative position and preventing passengers from leaving the cars, but when a given car comes opposite the auxiliary load carrying element 2, a fixed cam rail 32 engages a dog 33 connected to a chain 34 passing over pulleys 35 and 36, and connected at its other end to a guard member 30, the cam rail being of such shape as to push downwardly dog 33 and thus raise the member 30 out of operative position until the corresponding car passes beyond the auxiliary element 2. The position of the guard member 30 is illustrated by the broken line 37 in Figure 2, also the shape of cam rail 32 which corresponds to the dot and dash line of such figure.

In connection with the embodiment of the invention illustrated in Figure 6, a partition 38 additional to the guard member 30 preferably is employed adjacent the portion of the periphery of the auxiliary element 24 which is not enclosed by the load carrying element 1, thus preventing passengers or goods from passing off this section of the auxiliary element.

While certain preferred embodiments of the invention have been described, it is obvious that many changes may be made therein without departing from its spirit as defined in the following claims:

I claim:

1. In combination, means for guiding a load carrying element along an endless path, a load carrying element extending substantially throughout the entire length of such path, means for driving said load carrying element at a predetermined speed, an auxiliary load carrying element also provided with means to guide the same along a local endless path having a portion lying contiguous to the path of said first mentioned driving element, and means for driving said auxiliary load carrying element at an intermediate speed.

2. The combination set forth in claim 1 wherein the path of said auxiliary load carrying element is provided with portions contiguous to parts of said first mentioned element which travel in different directions.

3. The combination set forth in claim 1 wherein said load carrying elements are driven by primary windings and secondaries of the induction motor type respectively associated with each load carrying element and its path, together with electrical circuits leading respectively to said primary windings to create therein fields which move at different rates of speed.

4. In combination, an endless track, a plurality of cars carried by said track to constitute a load carrying element occupying substantially the entire length of the track, an auxiliary endless track also carrying cars as above described and having a portion lying contiguous to the first mentioned track, and means for driving the cars along said tracks at graduated speeds.

5. The combination set forth in claim 1 wherein said first mentioned load carrying element is provided with a guard member normally obstructing passage to and from such element, together with means for moving said guard member to an inoperative position at points along the load carrying element which are contiguous to the auxiliary load carrying element.

6. In combination, means for guiding a load carrying element along an endless path, a load carrying element extending substantially throughout the entire length of such path, an auxiliary load carrying element also moving in an endless path having a curved portion of substantial width lying contiguous to the path of said first mentioned load carrying element, together with means for imparting angular motion to the auxiliary load carrying element at such contiguous portion of its path, about an axis spaced from the first mentioned load carrying element whereby points on said curved portion travel at velocities progressively increasing towards said first mentioned load carrying element.

7. In combination, means for guiding a load carrying element along an endless path having a curved portion therein, a load carrying element extending substantially throughout the length of such path, an auxiliary load carrying element also provided with means to guide the same in a local endless path having a portion of substantial width lying along and within the curved portion of said first mentioned path, and means for driving said load carrying elements whereby points on said curved portion of the auxiliary load carrying element move at velocities progressively increasing toward the first mentioned load carrying element.

8. In combination, means for guiding a load carrying element along an endless path having an arcuately shaped portion therein, a load carrying element extending substantially throughout the length of such path, a circular auxiliary load carrying element located within and concentric with said arcuately shaped portion, and means for driving said load carrying elements, whereby points on the auxiliary load carrying element move at velocities progressively increasing toward the arcuately shaped portion of the first mentioned load carrying element.

9. The combination set forth in claim 6, wherein the load supporting surface of said auxiliary element is concave to counteract the effect of centrifugal force.

10. In combination, means for guiding a load-carrying element along an endless path, a load-carrying element extending substantially along the entire length of such path, guard devices adapted in operative position to obstruct passage to and from substantially all points along such element, and automatic means whereby said guard devices are moved to inoperative position at a predetermined point along said path and returned to operative position as soon as the corresponding portion of such load-carrying element has passed such point.

11. In combination, means for guiding a load-carrying element along an endless path, a load-carrying element extending substantially throughout the entire length of such path, a guard member normally obstructing passage to and from such element, and means for moving said guard member to inoperative position at a predetermined point along said path, said guard member being slidably carried by said load element, and said means including a cam rail disposed along the path of said element to control the position of said guard rail.

12. The combination set forth in claim 1, together with means obstructing passage to and from said first-mentioned load-carrying element except at such contiguous portions of the paths of said load-carrying elements.

13. In combination, a track, a loading and unloading station adjacent thereto, a car adapted to move along said track, a guard member movably carried by said car and extending longitudinally thereof on the side of the car adjacent said station, said guard member normally obstructing passage to and from the car, and automatic means whereby said guard member is moved to inoperative position when the car reaches the station, and returned to normal position as soon as the car passes the station.

14. The combination specified in claim 6, wherein said auxiliary load carrying element is provided with guide members extending toward its periphery.

15. In combination, means for guiding a load carrying element along an endless path, a load carrying element extending substantially throughout the entire length of such path, means for driving said load carrying element at a predetermined speed, a plurality of auxiliary load carrying elements each provided with means to guide the same along local endless paths having portions lying contiguous to each other and to the path of said first mentioned driving element, and means for driving said auxiliary load carrying elements at intermediate graduated speeds.

16. The combination set forth in claim 15, wherein said load-carrying elements are driven by primary windings and secondaries of the induction motor type respectively associated with each load-carrying element and its path, together with electrical circuits leading respectively to said primary windings to create therein fields which move at different rates of speed.

In testimony that I claim the foregoing, I have hereunto set my hand this 19th day of May, 1922.

HENRY S. PUTNAM.